United States Patent [19]
Bleeker

[11] Patent Number: 5,194,122
[45] Date of Patent: Mar. 16, 1993

[54] METHOD FOR RECOVERING VOLATILE, ORGANIC COMPOUNDS FROM MANURE

[75] Inventor: Erik D. J. Bleeker, Epe, Netherlands
[73] Assignee: MeMon B.V., Netherlands
[21] Appl. No.: 511,553
[22] Filed: Apr. 20, 1990

[30] Foreign Application Priority Data

Mar. 16, 1990 [NL] Netherlands ............... 9000618

[51] Int. Cl.$^5$ .................................. B01D 3/34
[52] U.S. Cl. ........................... 203/34; 71/21; 203/44; 203/51; 203/60; 203/62; 203/63; 203/67
[58] Field of Search ............... 71/86, 21, 121; 203/34, 203/44, 59, 48, 51, 60, 62, 63, 67; 159/47.3

[56] References Cited

U.S. PATENT DOCUMENTS

| | | | |
|---|---|---|---|
| 2,867,655 | 1/1959 | Othmer | 203/34 |
| 3,345,152 | 10/1967 | Appleman | 71/21 |
| 3,714,162 | 1/1973 | Chupp | 71/93 |
| 3,966,607 | 6/1976 | Gaynor et al. | 210/137 |
| 3,985,079 | 5/1975 | Haskell et al. | 428/346 |
| 4,018,899 | 4/1977 | Seckler et al. | 210/772 |
| 4,270,974 | 6/1981 | Greenfield et al. | 159/16 |
| 4,283,221 | 8/1981 | Vogel et al. | 71/76 |
| 4,608,120 | 8/1986 | Greenfield et al. | 159/17.1 |

FOREIGN PATENT DOCUMENTS 0132700 7/1984 European Pat. Off.
0259583 7/1987 European Pat. Off.

OTHER PUBLICATIONS

"Solvent Extraction With Amines For Recovery Of Acetic Acid From Dilute Aqueous Industrial Streams," Ricker et al., I. Separ. Proc. Technol., 1, 23-30 (1980).
"Natuur en Techniek," 57, 894-903 (1989).

Primary Examiner—Virginia Manoharan
Attorney, Agent, or Firm—Webb, Burden, Ziesenheim & Webb

[57] ABSTRACT

A method for recovering volatile, organic compounds from manure, by:
  i) acidifying and concentrating the manure;
  ii) condensing the formed vapor; and
  iii) separating the volatile, organic compounds from the condensate.

Preferably the volatile, organic compounds are removed from the condensate by liquid extraction, crystallization, distillation and/or ion exchange.

13 Claims, 1 Drawing Sheet

METHOD FOR RECOVERING VOLATILE, ORGANIC COMPOUNDS FROM MANURE

The present invention relates to a method for recovering volatile, organic compounds from manure.

For the cost-effectiveness of processing processes for manure it is important to separate as many valuable products as possible from the manure. Not only the sale price of these valuable products is of importance but especially also the costs at which these products can be separated from the manure.

In processing processes known to date all attention has been devoted to separating solid matter from the manure, the so-called manure cake, which is a valuable fertilizer after drying.

A first, known processing process is the so-called Promest process, wherein the manure is first fermented in a fermentation installation in order to generate biogas. Subsequently separated from the fermented manure are the solids which after drying form a valuable product as manure cake. As a consequence of the fermentation practically all organic compounds are degraded.

A second known processing process is the so-called Greenfield process (U.S. Pat. No. 3,855,079, U.S. Pat. No. 4,270,974 and U.S. Pat. No. 4,608,120). According to this processing process a non-volatile oil is added to the manure and the oil slurry formed is dehydrated by evaporation under the influence of heat, whereafter oil residues are removed from the formed condensate which can be discharged as effluent after biological treatment. The biogas formed during the biological degradation can be used in the processing process, see further "Natuur en Techniek" 57, 894–903 (1989).

The invention is based on the insight that present in manure are valuable, volatile organic compounds which are economically separable from the manure if condensate is removed from the manure without prior fermentation thereof and this condensate is subjected to a suitable physico-chemical separation process for separating the volatile organic compounds. These compounds can be separated since on the one hand they are organic and on the other hand they are volatile. The organic character makes it possible to separate them from inorganic components in the manure, for example by means of the used oil as carrier liquid, and the volatile character makes it possible to separate them from non-volatile organic compounds which will remain behind in the oil.

The invention thus provides a method for recovering volatile, organic compounds from manure, which is characterized in that the method comprises:
i) concentrating the manure;
ii) condensing the formed vapor; and
iii) separating volatile, organic compounds from the condensate.

Suitable volatile, organic compounds are largely compounds with one to six carbon atoms, in particular however volatile fatty acids such as acetic acid, propionic acid, butyric acid, isobutyric acid, valeric acid and isovaleric acid. These organic compounds are not only valuable, they are also present in relatively large quantities in the condensate.

A usual condensate contains for example per m$^3$ 8–11 kg acetic acid, 1–5 kg propionic acid, 0.2–1 kg isobutyric acid, 0.5–1.5 kg butyric acid and 0.2–0.7 kg isovaleric acid.

With the method according to the invention it is possible to recover these volatile organic compounds and the added value of these organic compounds to the manure processing process is greater than that of biogas that may be formed from these organic compounds.

The separating of the volatile, organic compounds from the condensate can take place according to many known physico-chemical methods.

A reliable, relatively simple and economic method is liquid extraction.

A number of extraction agents are particularly preferable because of their low cost-price, high volatility and high distribution co-efficients in equilibrium.

A first group of favorable extraction agents comprises organic alkylphosphine oxides. Particularly suitable are the trialkylphosphine oxides such as trioctylphosphine oxide, trihexylphosphine oxide, sec-butyldioctylphosphine or mixtures thereof. In this context reference is made to the European patent application EP-A-132.700 and EP-A-259.583, which describe liquid extractions wherein the alkylphosphine oxides are used as extraction agents. The liquid extraction methods described all relate only to the removal of carbonic acids, aldehydes, ketones, alcohols and phenols from waste flows which are for example released during the preparation of cellulose, phenol and the Fischer-Tropsch process.

Another group of suitable extraction agents is the group of higher alkylamines. Preferred are trialkylamines, in particular trioctylamine and di-tridecylamine. For further information regarding the use of amines in liquid extraction reference is made to N. L. Ricker et al, J. Separ. Proc. Technol. 1, 23–30, (1980).

A polar solvent is preferably added to the extraction agent whereby the extraction efficiency for the volatile, organic compounds for separation improves. Suitable polar solvents are alcohol, such as ethylhexanol, halogenated hydrocarbons, such as chloroform, esters, and ketones, such as diisobutyl ketone and cyclohexanone.

Other methods for separating volatile, organic compounds, optionally after prior concentration for instance by evaporation or reversed osmosis, comprise distillation, ion exchange and crystallization. In the case of crystallization the corresponding, poorly water-soluble salts such as calcium salts can be separated.

It is favorable if prior to concentrating the manure, but still more preferably immediately after the production of the manure, the manure is acidified. On the one hand, premature fermentation and degradation of the desired volatile, organic compound is thereby avoided, and on the other hand odor problems are reduced and the transition of the volatile, organic compounds to for example the carrier oil used is promoted.

The method according to the invention can be applied to many types of manure, such as manure derived from cattle farms, pig farms and poultry farms and the like. Generally the manure may have a solid content of 7% but the method according to the invention is particularly suitable for manure with a higher solid content, such as preferably at least 10%, and more preferably to more than 14%. The advantage hereby results that in a central manure processing a smaller quantity of manure has to be transported and there results a smaller quantity of condensate with a higher concentration of the desired volatile, organic compounds.

DESCRIPTION OF THE FIRST AND SECOND EMBODIMENTS

Figure 1:
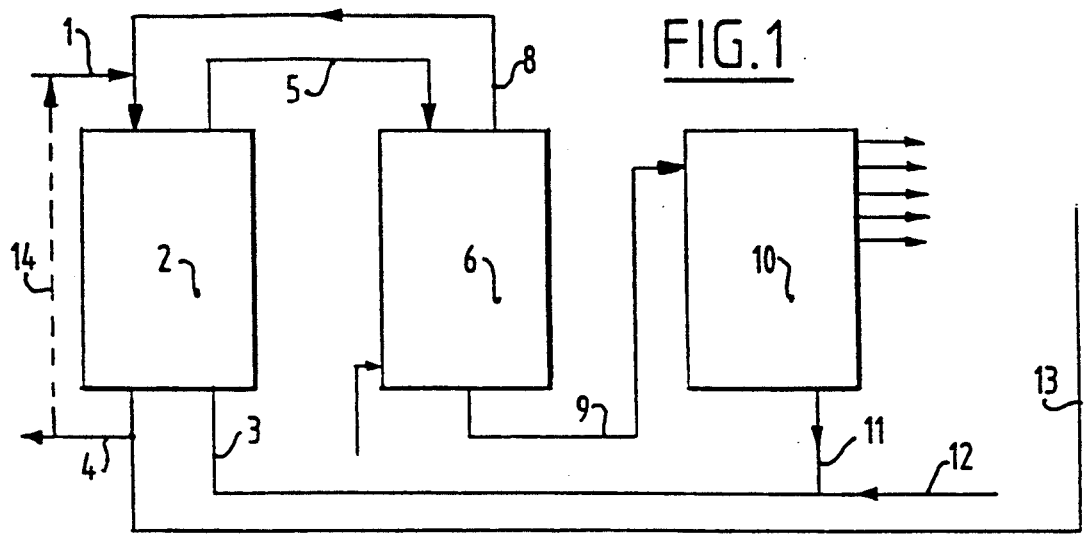
FIG. 1 illustrates a flow diagram of a first embodiment of the present process.
Figure 2:
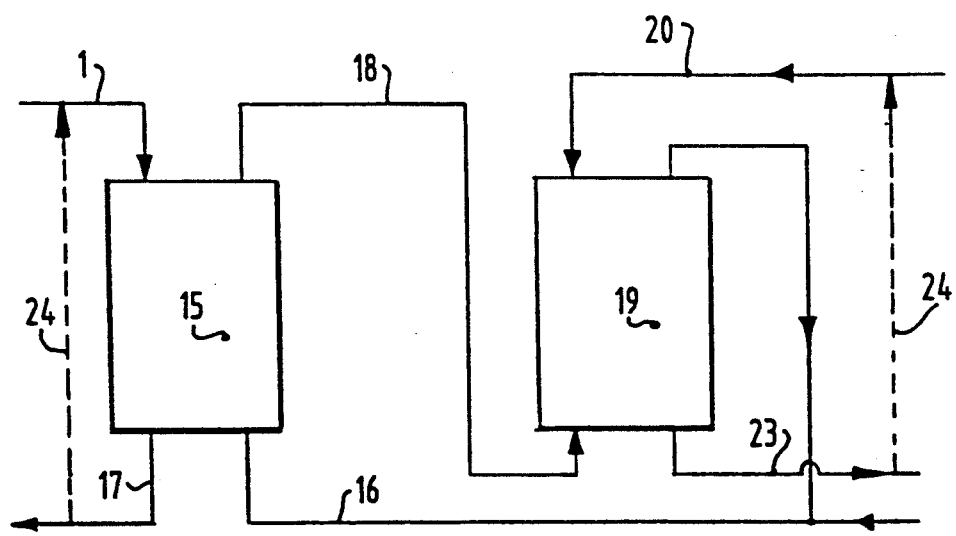
FIG. 2 illustrates a flow diagram of a second embodiment of the present process.

The method according to the invention will be described hereinafter with reference to two embodiments which are shown schematically as flow diagrams in the FIGS. 1 and 2.

Pig manure from which bulky waste is removed by sieves is subsequently acidified. The acidified manure is mixed with a water insoluble paraffin liquid with a boiling point of circa 180° C. The mixture of manure and paraffin is concentrated in a concentrator, wherein the vapor formed is condensed in a condenser. The condensate 1 is fed to an extractor 2 to which an extraction mixture is fed via the conduit 3. This extraction mixture consists of 40% sec-butyldioctylphosphine oxide and 60% n-dodecane.

The treated condensate 4 is fed to a biological aftertreatment installation. The loaded extraction liquid is fed via the conduit 5 to a dehydrator 6 wherein using steam supplied via the conduit 7 water is removed from the loaded extraction liquid and fed back to the extractor 2 via the conduit 8.

The loaded extraction liquid with the water removed is fed to a distillation column 10. The distillation column can carry out a fractional distillation, whereby the more volatile, organic compounds leave the distillation column at a higher level. Operating at a pressure of 0.2 bar and a pot temperature of 135° C., isovaleric acid, butyric acid, isobutyric acid, propionic acid and acetic acid can be successively fractionated. The extraction agent stripped of the volatile, organic compounds is fed via the conduit 11 to the extractor 2 via the conduit 3, optionally supplemented with fresh extraction agent via the conduit 12.

If necessary a number of the lower-boiling organic compounds can be carried away via the conduit 13 to the condensate conduit 4 for further degradation in the biological treatment installation. Finally, it is possible to feed back a portion of the condensate from the conduit 4 via the conduit 14 to the condensate feed conduit 1.

In the second embodiment of the method according to the invention condensate is fed via the conduit 1 to an extractor 15 to which an extraction agent is further supplied via the conduit 16. This extraction agent consists of a mixture of a tertiary amine with a mean molecular weight of approximately 392 (Alamine 336 of General Mills Inc.), and 60% ethylhexanol.

The extracted condensate leaves the extractor 15 via the conduit 17. The loaded extraction mixture is fed via the conduit 18 to a second extractor 19 to which a watery alkaline solution (for example, 0.5 N caustic soda) is fed via the conduit 20. The extraction agent leaves the extractor 19 via the conduit 21 and is optionally supplemented via the conduit 22 with fresh extraction agent fed to the extractor 15 via the conduit 16. The product flow leaves the extractor 15 via the conduit 23. This product flow contains a solution of sodium salts of C2-C5 fatty acids. This mixture can subsequently be separated into the various compounds with known, usual separating methods.

If required, a portion of the treated condensate can be fed back to the extractor 15 via the conduit 24. It is further possible that the product flow be fed via the conduit 24 to the second extractor 19.

Although the present invention is particularly concentrated on the separating of the volatile, lower alkylcarbonic acids, it is also possible using the described method according to the invention to separate lower alkylalcohols, lower alkylesters, lower alkylketones and lower alkylaldehydes from the manure, to the extent that their presence makes this economically worthwhile.

I claim:

1. Method for recovering volatile, organic compounds from manure, consisting essentially of:
   i) acidifying the manure;
   ii) concentrating by evaporation the acidified manure;
   iii) condensing the formed vapor; and
   iv) separating the volatile, organic compounds from the condensate; wherein the steps of concentrating by evaporation and condensing are carried out prior to fermentation of the manure.

2. Method as claimed in claim 1, wherein the volatile, organic compounds are separated from the condensate by liquid extraction using an extraction agent.

3. Method as claimed in claim 2, wherein said extraction agent is an organic alkylphosphine oxide.

4. Method as claimed in claim 3, wherein said organic alkylphosphine oxide is a trialkylphosphine oxide.

5. Method as claimed in claim 3, wherein said organic alkylphosphine oxide is trioctylphosphine oxide, trihexylphosphine oxide, sec-butyldioctylphosphine oxide, or mixtures thereof.

6. Method as claimed in claim 2, wherein said extraction agent is an alkylamine.

7. Method as claimed in claim 6, wherein the alkylamine is a trialkylamine.

8. Method as claimed in claim 7, wherein the trialkylamine is selected from the group consisting of trioctylamine and di-tridecylamine.

9. Method as claimed in claim 2, wherein the liquid extraction takes place in the presence of a polar solvent.

10. Method as claimed in claim 9, wherein said polar solvent is selected from the group consisting of alcohol, halogenated hydrocarbon, esters, and ketones.

11. Method as claimed in claim 1, wherein the volatile, organic compounds are separated by at least one of the steps of crystallization, distillation and ion exchange.

12. Method as claimed in claim 1, wherein the manure to be concentrated has a dry solid content of at least 7%.

13. Method as claimed in claim 1, wherein the volatile, organic compounds to be recovered comprise C1-C5 fatty acids.

* * * * *